(12) United States Patent
Burkland et al.

(10) Patent No.: US 8,392,143 B2
(45) Date of Patent: Mar. 5, 2013

(54) FIXED-SOURCE ARRAY TEST STATION FOR CALIBRATION OF A SEMI-ACTIVE LASER (SAL) SEEKER

(75) Inventors: Michael K. Burkland, Tucson, AZ (US); Casey T. Streuber, Tucson, AZ (US); Kristofer E. Tvedt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 302 days.

(21) Appl. No.: 12/947,234

(22) Filed: Nov. 16, 2010

(65) Prior Publication Data

US 2012/0143551 A1    Jun. 7, 2012

(51) Int. Cl.
*G01C 19/00* (2006.01)
(52) U.S. Cl. .................................................. 702/104
(58) Field of Classification Search .................. 702/104
See application file for complete search history.

(56) References Cited

U.S. PATENT DOCUMENTS

| | | | |
|---|---|---|---|
| 5,457,493 A * | 10/1995 | Leddy et al. | 348/164 |
| 5,781,281 A | 7/1998 | Miyano | |
| 6,742,901 B2 | 6/2004 | Kimura et al. | |

\* cited by examiner

*Primary Examiner* — Jonathan C Teixeira Moffat
*Assistant Examiner* — Stephen Cherry
(74) *Attorney, Agent, or Firm* — Eric A. Gifford

(57) ABSTRACT

A fixed-source array test station provides a cost-effective high-throughput test bed for testing optical sensors that require stimulus at fixed angular positions. A SAL seeker requires stimulus at fixed angular position across its FOV to calibrate its spatial transfer function (STF). An array of fixed collimated sources at different angular positions is aligned so that their beams overlap the entrance pupil of the sensor under test. Each source may comprise an inexpensive light emitting diode (LED) or vertical cavity surface emitting laser (VCSEL) and collimator. To simplify alignment the sources may be positioned on and perpendicular to the surface of a sphere with the seeker's entrance pupil located at the center of the sphere. The sources are activated in accordance with an activation profile in order to calibrate or otherwise test the sensor.

17 Claims, 13 Drawing Sheets

$$\Delta X \approx \frac{(A+D) - (B+C)}{A+B+C+D}$$

$$\Delta Y \approx \frac{(A+B) - (C+D)}{A+B+C+D}$$

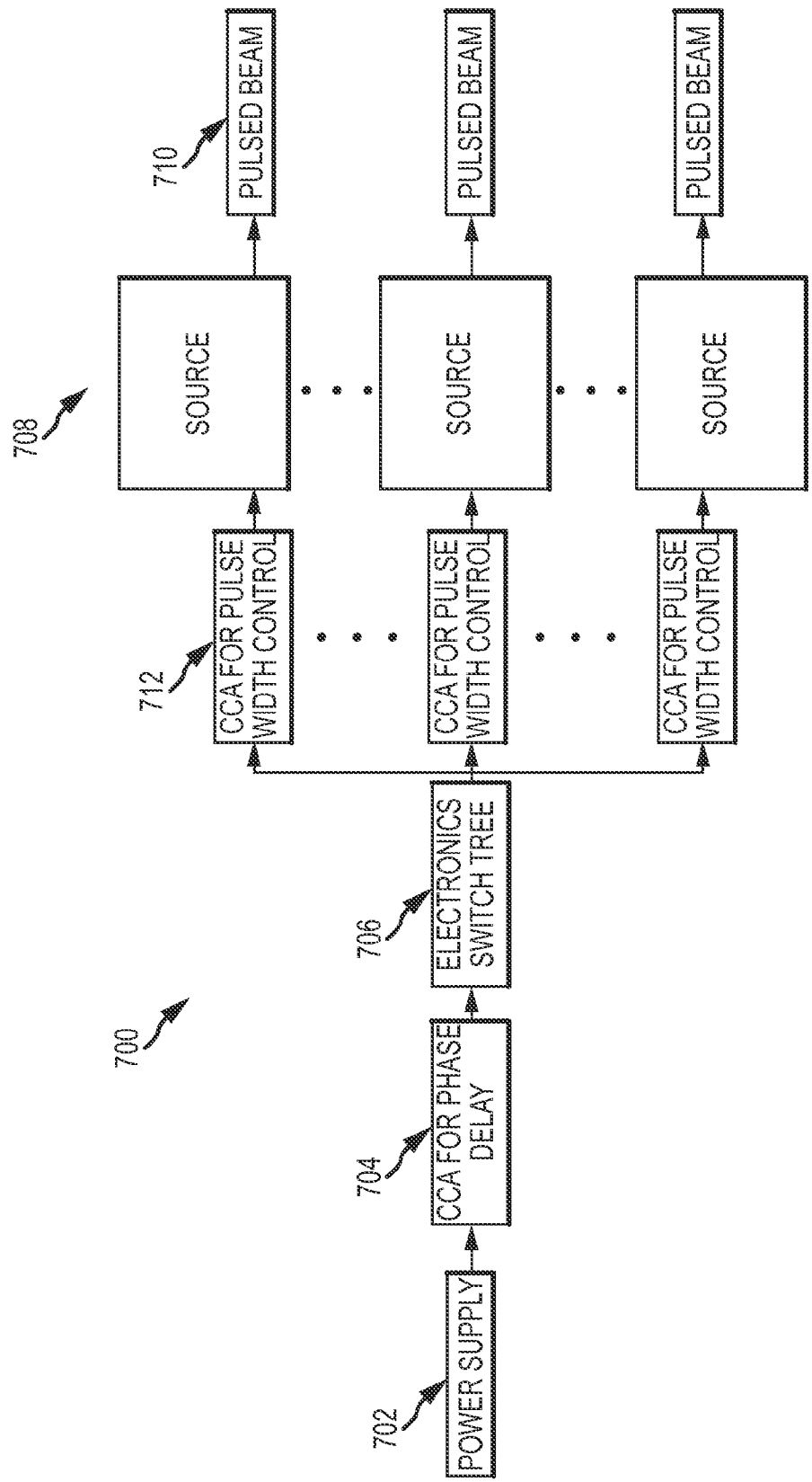

| HIGH FIDELITY CALIBRATION | | |
|---|---|---|
| | SOA TEST BED | FSA TEST BED |
| NUMBER OF CALIBRATION POINTS | 1000 | 1000 |
| MAX PULSE REPETITION FREQUENCY (PRF) [Hz] | 100 | 1.00E+04 |
| REQUIRED NUMBER OF SAMPLES PER CALIBRATION POINT | 50 | 10 |
| LAG TIME BETWEEN CALIBRATION(S) | 2.50E+00 | 1.00E-05 |
| TOTAL TEST TIME [min]: | 50 | 0.016833 |
| TOTAL TEST TIME [s]: | 3000 | 1.01 |

| MEDIUM FIDELITY CALIBRATION | | |
|---|---|---|
| | SOA TEST BED | FSA TEST BED |
| NUMBER OF CALIBRATION POINTS | 400 | 400 |
| MAX PULSE REPETITION FREQUENCY (PRF) [Hz] | 100 | 1.00E+04 |
| REQUIRED NUMBER OF SAMPLES PER CALIBRATION POINT | 50 | 10 |
| LAG TIME BETWEEN CALIBRATION(S) | 2.50E+00 | 1.00E-05 |
| TOTAL TEST TIME [min]: | 20 | 0.006733 |
| TOTAL TEST TIME [s]: | 1200 | 0.404 |

| LOW FIDELITY CALIBRATION | | |
|---|---|---|
| | SOA TEST BED | FSA TEST BED |
| NUMBER OF CALIBRATION POINTS | 100 | 100 |
| MAX PULSE REPETITION FREQUENCY (PRF) [Hz] | 100 | 1.00E+04 |
| REQUIRED NUMBER OF SAMPLES PER CALIBRATION POINT | 50 | 10 |
| LAG TIME BETWEEN CALIBRATION(S) | 2.50E+00 | 1.00E-05 |
| TOTAL TEST TIME [min]: | 5 | 0.001683 |
| TOTAL TEST TIME [s]: | 300 | 0.101 |

FIG.11

FIXED-SOURCE ARRAY TEST STATION FOR CALIBRATION OF A SEMI-ACTIVE LASER (SAL) SEEKER

BACKGROUND OF THE INVENTION

1. Field of the Invention

This invention relates to guided projectiles that engage targets by detecting and following laser light scattered from the targets, and more particularly to a test station for calibration of the spatial transfer function (STF) of the semi-active laser (SAL) seeker.

2. Description of the Related Art

Laser guided ordinance is commonly used to engage point targets with a high probability of success and minimal collateral damage. Such ordinance includes guided artillery projectiles, guided missiles, and guided bombs, all of which will be referred to herein as "projectiles".

A laser guided projectile's guidance system typically includes a semi-active laser (SAL) seeker, fixed-post or gimbaled, to detect pulsed laser electro-magnetic radiation (EMR) scattered from the intended target and to provide signals indicative of the target bearing and a flight controller that processes the signals to manipulate one or more control surfaces (e.g. fins or canards) to guide the projectile to the target. The SAL seeker includes a non-imaging optical system that captures and focuses the scattered laser EMR into a spot onto a segmented non-imaging detector (e.g. a quad-cell detector) or imaging detector. As the target bearing changes the position of the spot on the detector changes. The detector compares the integrated EMR incident on each cell (segment) to calculate a spatial displacement of the centroid of the spot. The effective field-of-view (FOV) is dictated by the central monotonic region of the detector's spatial transfer function (STF) in which the spot is incident on all four cells, which is in turn determined by the spot size. The detector's central monotonic region is commonly referred to as the "linear" region. The seeker maps the spatial displacement $\Delta X$ and $\Delta Y$ along orthogonal axes to Azimuth (Az), Elevation (El) angles in a calibration table to select an angle measurement as an estimate of the bearing to target.

Referring now to FIG. 1, a laser guided projectile 100 may engage a target 190 by detecting and following scattered laser radiation 195 from the target 190. In FIG. 1, the target 190 is represented as a tank, but may be another type of vehicle, ship, boat, or a structure, building or other stationary object. The target 190 may be illuminated with laser radiation 185 from a laser designator 180. The laser designator 180 may be located on the ground, as shown in FIG. 1, or may be located in a vehicle, ship, boat, or aircraft. The laser designator could be located on the projectile itself. This is typically referred to as an active laser seeker. The scattered laser radiation 195 is a portion of the illumination laser radiation 185.

The laser-guided projectile 100 may include a projectile body 115, control surfaces 125, and a guidance system. The guidance system may include a SAL seeker, of which only a transmissive dome 132 is visible in FIG. 1. The guidance system may include a flight control system to control the flight of the laser guided projectile 100 by manipulating one or more control surfaces 125 based on at least one guidance signal from the SAL seeker. In the example of FIG. 1, the control surfaces 125 are shown as canards, but may be fins, wings, ailerons, elevators, spoilers, flaps, air brakes or other controllable devices capable of affecting the flight path of the laser guided projectile 100.

FIG. 2a shows a frontal view of a detector 250 and a focused laser spot 245. The detector 250 may comprise a "quad-cell" detector including four quadrants or "segments" A, B, C, D. Other detector configurations including multiple segments may be used. Each quadrant may produce a corresponding signal A, B, C, and D in response to the integrated laser power incident upon each quadrant. Guidance signal $\Delta X$ may indicate an imbalance between the laser power incident upon the left (quadrants A and B) and right (quadrants C and D) halves of the detector 250. Guidance signal $\Delta Y$ may indicate an imbalance between the laser power incident upon the top (quadrants A and C) and bottom (quadrants B and D) halves of the detector 250. The terms "left", "right", "top", and "bottom" refer to the detector 250 as shown in FIG. 2a and do not imply any physical orientation of the detector 250 within a projectile 100. When the laser spot 245 is centered on the detector 250, the signals A, B, C, D may be essentially equal and the guidance signals $\Delta X$ and $\Delta Y$ may both be zero or nearly zero.

More particularly, the detector 250 may effectively measure the centroid of the incident EMR on the detector 250. The spatial transfer function (STF) 255 is a ratio of the laser power on the different quadrants of the detector. When laser power in spot 245 is hitting all four quadrants A-D, the guidance system operates in a linear region (or more generally a "monotonic" region) 260 of the transfer function 255. Within the linear region $\Delta X=((A+D)-(B+C))/(A+B+C+D)$ and $\Delta Y=((A+B)-(C+D))/(A+B+C+D)$ where A, B, C and D are integrated laser power incident on the respective cells. The transfer function 255 in the linear region 260 determines via a calibrated look-up table (LUT) the Az, El angles of the guidance system from the target (e.g. target bearing). When laser power is hitting only two quadrants, the guidance system operates outside the linear region, where the transfer function nears +/−1. The guidance system only knows the direction towards the target, but not its true angle.

The SAL seeker is calibrated offline to generate the calibration LUT that maps the measured and calculated $\Delta X$ and $\Delta Y$ to the Az, El angle pairs over a field-of-view (FOV) and with an angular resolution required for a mission. The SAL detector is mounted on a high precision 3-axis stage. A single Q-switched laser and collimator are mounted in a static fixture to direct a pulsed beam to simulate a spot reflected off a target. A controller rotates the SAL sensor on the 3-axis stage to specified locations to detect the stationary target. A computer records the measurements and maps each $\Delta X$, $\Delta Y$ pair to the Az,El pair for each location of the stage to generate the LUT. This test station and methodology is both expensive and slow. Currently, the total cost of a test station is >$350,000; $100000 for the Q-switched laser and focusing optics, $100,000 for the collimator and $150,000 for the 3-axis stage. The cost is driven by the required angular resolution of both the source and rotation of the stage. A typical medium-fidelity calibration may involve 400 measurements. For each measurement, the 3-axis stage must rotate to the specified location and settle, which takes approximately 2.5 seconds. Data acquisition requires another 0.5 seconds to detect a sufficient number of pulses (e.g. 50) at the Q-switched laser's maximum operable PRF (e.g. 100 Hz) for a high SNR measurement. The medium-fidelity calibration of a single SAL seeker requires approximately 20 minutes. A high-fidelity calibration may take up to 50 minutes. Furthermore, as both the FOV and fidelity specifications increase the calibration time will increase. In a manufacturing environment that must calibrate thousands of seekers the time requirement is burdensome and expensive. Their remains a long felt need for a more cost-effect and time-efficient method to calibrate SAL seekers.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a cost-effective test station for calibration of SAL seekers with a high unit throughput.

In an embodiment, a test station for calibrating a semi-active laser (SAL) seeker including a SAL detector comprises a fixture for mounting the SAL seeker. This fixture may be fixed or allow some range of motion to adjust the alignment of the seeker but does not require a 3-axis stage. The seeker has an entrance pupil to detect optical energy over a field of view (FOV) and focus the optical energy into a spot on the SAL detector. The SAL detector may comprise a segmented non-imaging detector such as the convention quad-cell detector or an imaging detector. An array of fixed collimated optical sources generates respective temporally pulsed optical beams. Each SAL source may comprise an inexpensive light emitting diode (LED) or vertical cavity surface emitting laser (VCSEL) and collimator. Alternatively each source could be generated via a fiber-coupled laser and optical switch matrix. The pulse width of the LED and VCSEL may be set to a low noise region of the SAL detector. The LED and VCSEL's pulse repetition frequency (PRF) may be greater than 1 kHz. The sources are positioned over the FOV of the seeker and co-aligned so that their respective optical beams overlap the entrance pupil of the seeker. To simplify alignment at the entrance pupil, the sources may be positioned on and perpendicular to a sphere with the seeker's entrance pupil located at the center of the sphere. A memory stores a source activation profile to generate a transfer function for the SAL detector. The transfer function maps a spatial displacement $\Delta X$ and $\Delta Y$ in orthogonal axes of a centroid of the spot to azimuth and elevation angles for the source of the spot. A controller responsive to the source activation profile activates the sources in a phase-delayed or electrically switched manner to implement the activation profile. A computing device is responsive to the measured spatial displacement $\Delta X$ and $\Delta Y$ for each source as it is activated to create a table entry for the transfer function in a calibration table that maps the measured $\Delta X$ and $\Delta Y$ to the known azimuth and elevation angles of the activated source. The calibration table is stored with the SAL seeker.

In another embodiment, the test station stores in memory one or more activation profiles for different tests of the SAL seeker that require spatial or temporal stimulus patterns at fixed angular positions such as calibration, verification or characterization. For a given test, the computing device selects the appropriate activation profile, retrieves it from memory and provides it to the controller, which activates the sources according to the activation profile. The SAL detector senses the incident optical radiation according to the activation profile and passes the data to the computing device, which in turn processes the data In another embodiment, the test station is used to test an optical sensor that requires stimulus at fixed angular positions over its FOV. The optical sensor is mounted on a fixture. An array of fixed collimated optical sources are distributed over the FOV of the sensor and co-aligned so that their respective optical beams overlap the entrance pupil of the sensor. A memory stores one or more source activation profiles to perform different tests. A controller responsive to a selected source activation profile activates the sources to implement the activation profile. A computer selects the source activation profile for a particular test, retrieves it from memory and provides it to the controller and is responsive to sensor data recorded for each source to process the data to perform the test. The tests may, for example, include calibration, verification or characterization.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7a and 7b are electronics and opto-mechanical block diagrams for the fixed-source array;

FIG. 11 is a table comparing the test times for the fixed-source array and the single-source test stations for low, medium and high fidelity calibration.

DETAILED DESCRIPTION OF THE INVENTION

Figure 1:
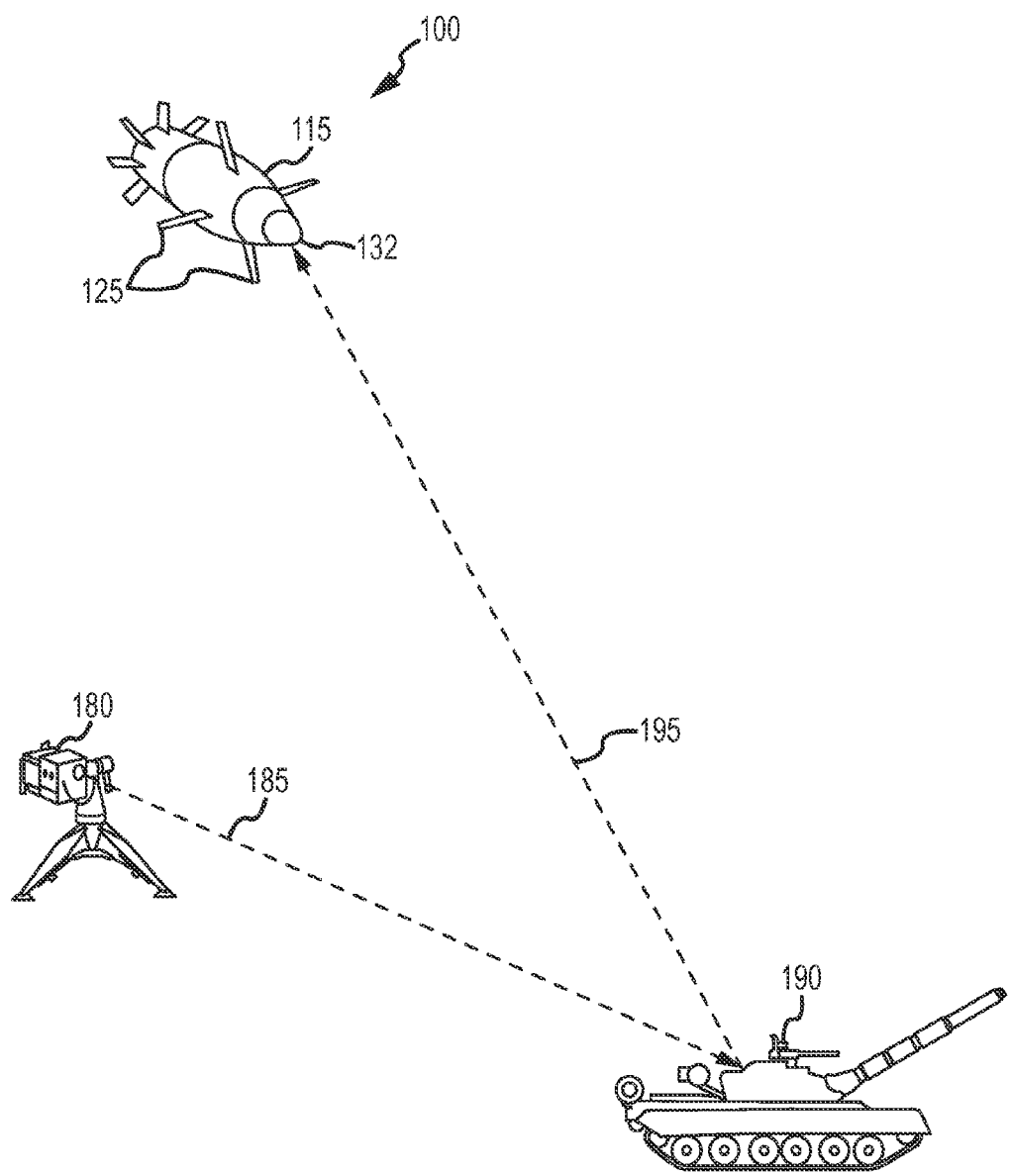
FIG. 1, as described above, is a schematic illustration of a laser-guided projectile engaging a target.

The present invention provides a cost-effective high-throughput test station for testing optical sensors that require stimulus at fixed angular positions over a FOV. For example, SAL seekers require stimulus one point at a time over the FOV to perform the STF calibration. The station may also be used to perform verification and characterization of the SAL seeker and to calibrate the boresight alignment between the SAL and infrared (IR) sensors in a dual-mode system. A dual-mode sensor system typically consists of co-aligned SAL and long wave infrared (LWIR) sensors, but in general the IR imaging sensor can operate in any desired band. The system may also be used to calibrate the distortion in an IR imaging system and to calibrate the gimbal orientation in a gimbaled system. These tests may require source activation profiles with temporal and/or spatial patterns.

The test station includes an array of collimated optical sources at fixed angular positions relative to the entrance pupil of the sensor. The number of sources depends on the extent of the FOV and required angular fidelity for the test. For typical SAL detectors this may range, for example, from 100 to 1,000 points, hence sources. For this fixed-source array test station to replace the conventional single-source 3-axis stage sensor approach the test station should markedly reduce overall system cost and significantly improve test throughput while maintaining performance, and do so in a footprint and physical configuration that is practical. The problems to overcome as apparent to one skilled in the art were many. To reduce system cost, the per source cost (including collimation optics) had to be very low. Each of these sources had to satisfy the collimation specification at a reasonable distance (e.g. approximately 5 ft to 20 ft) from the sensor. The sources had to be small enough that their placement at the required angular resolution at that distance did not interfere with each other mechanically or optically (vignetting the beam of the neighboring source). Each source had to be capable of generating its pulsed beam with a sufficiently high pulse repetition frequency (PRF) such that the measurement time for a single point is sufficiently short. The fixed-source array had to be capable of switching from one source to another source very fast to maintain high throughput for point-by-point tests over the FOV such as SAL calibration or to perform more sophisticated activation patterns such as for SAL verification or characterization. Each of these challenges were overcome to provide a fixed-source test station that is on the order of a factor of ten less expensive and capable of a throughput that is at least three orders of magnitude (1,000×) faster than the conventional test station for calibrating a SAL STF.

Without loss of generality, an embodiment of a test station configured to calibrate the STF for a SAL seeker will be described. One of ordinary skill in the art will appreciate that the test station may be configured to perform other tests such as verification and characterization of the SAL seeker. The test station may also be configured to perform tests that require stimulus at fixed angular positions over the FOV for any optical sensor.

Figure 2A:
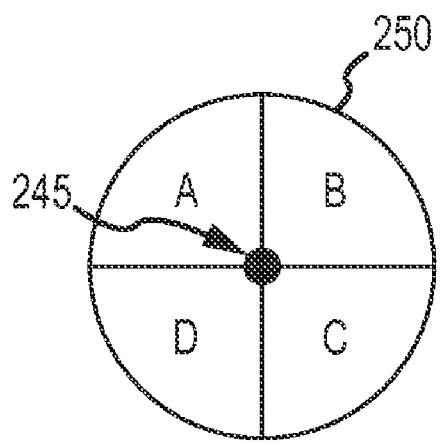
FIGS. 2a and 2b, as described above, are an embodiment of a quad-cell detector and its spatial transfer function.
Figure 2B:
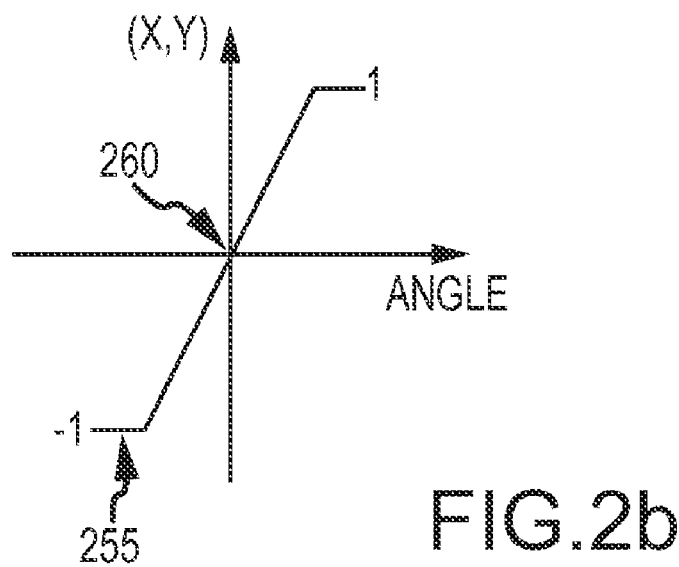
Figure 3:
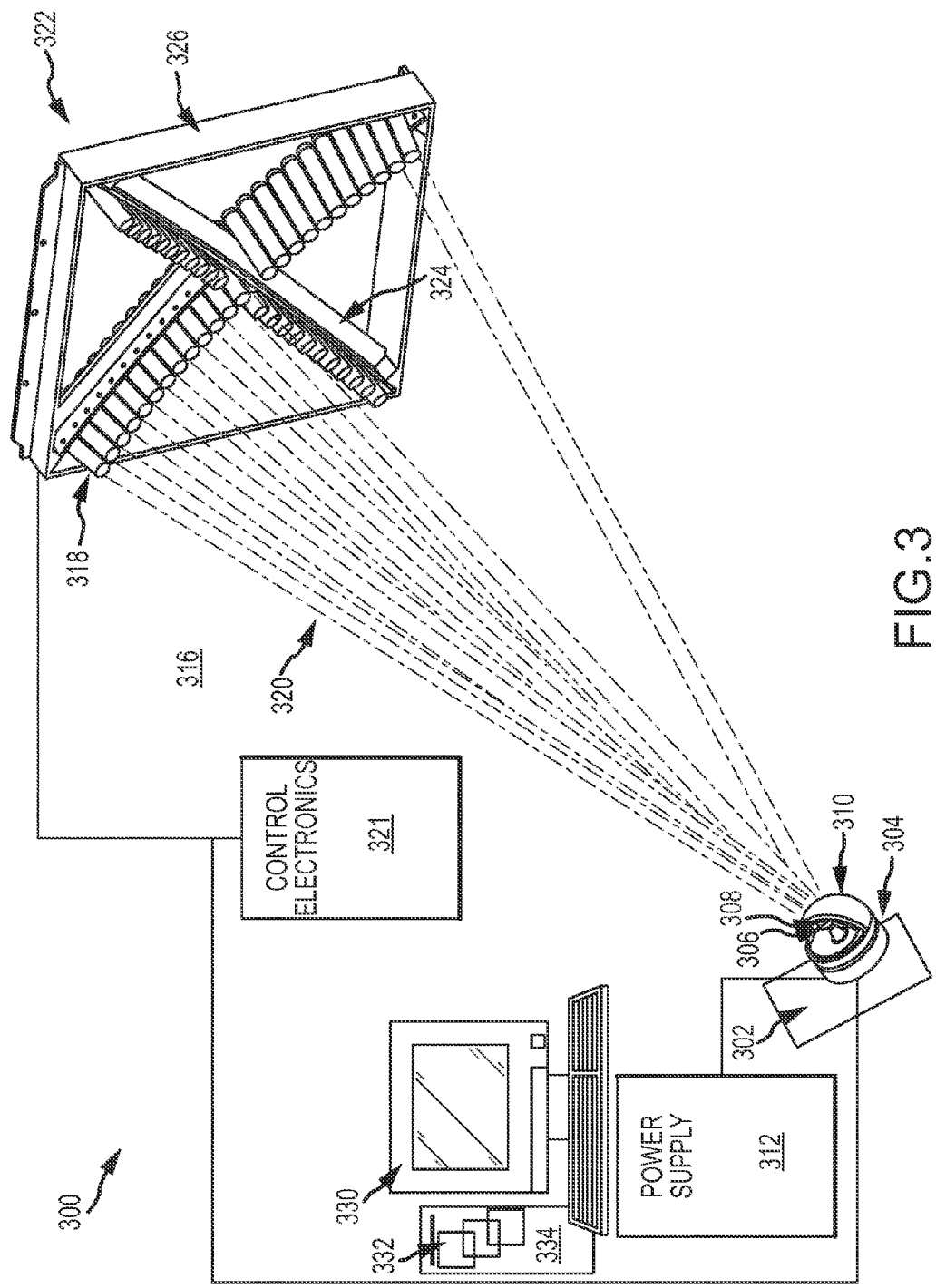
FIG. 3 is a diagram of a fixed-source array test station for calibration of a SAL seeker in accordance with the present invention.

Referring now to FIG. 3, a test station 300 includes a sensor fixture 302 for mounting a SAL seeker 304 (the unit under test). Fixture 302 may be a static fixture that provides for no movement, or it may be a fixture that provides some limited range of motion to align the SAL seeker prior to calibration and is then fixed throughout the test procedure or may provide for simple rotation about an axis if used in combination with a linear array of fixed sources. SAL seeker 304 comprises an optical system 306 having an entrance pupil 308 that gathers optical energy over a FOV and focuses the energy into a spot on a SAL detector such as shown in FIGS. 2a and 2b. The optical system may comprise a diffuser that spatially homogenizes the incident light to effectively increase the FOV. The SAL detector is mounted inside the seeker behind the optical system. The optical system may be fixed-post or mounted on a 1- or 2-axis gimbal behind a transmissive dome 310. A power supply 312 provides power for fixture 302 (if needed) and for SAL seeker 304 to drive the SAL detector and possibly a gimbal.

An array 316 of collimated optical sources 318 that generate respective temporally pulsed collimated beams 320 are mounted on a source fixture 322 at different fixed angular positions and aligned so that their beams 320 overlap the entrance pupil 308 of the SAL seeker. Control electronics 321 responsive to an activation profile control the activation of the individual sources. The sources are arrayed in a two-dimensional orthogonal pattern over the FOV. The sources could be arrayed in a two-dimensional rectangle or other pattern. Alternately, the sources could be arrayed in a one-dimensional pattern (and sensor fixture rotated to measure stimuli over a two-dimensional FOV). Source fixture 322 includes a crossed pair of arms 324 mounted across an external bracket 326. The arms are sections of sphere. Fixture 322 is positioned so that entrance pupil 308 of the SAL seeker lies at the center of the sphere. The optical sources 318 are mounted on arms 324 substantially perpendicular to the spherical surface so that their collimated beams 320 are aligned to and overlap the entrance pupil. Alternately, the arms may be planar, in which case each source would have to be independently aligned to the entrance pupil. Placing the sources on the surface of a sphere pointed at the entrance pupil at the center of the sphere eases alignment and reduces any problems of neighboring sources interfering with each other either mechanically or optically.

Depending on the FOV of the SAL Seeker and the required fidelity of the fixed angular positions, the number of sources may be 100 to 1,000 or even higher. To be cost-effective the per source cost must be low. This must be achieved without sacrificing angular fidelity and in a test system footprint and geometry that is practical. We use SAL sources such as LEDs or VCSELs that have a large divergence angle and very simple and inexpensive collimation optics. Initially it was thought that such sources could not be collimated in a manner that was cost-effective or physically practical; the sources would have to be placed at long distances from the sensor to appear in focus and not impact the calibration performance. These types of less-expensive sources are notorious for not having a repeatable divergence angle and can require highly sophisticated optics to collimate accurately. Furthermore, it was thought that the size of the optics required to overfill the entrance pupil would make the geometric construction of the array impossible, adjacent sources would either physically interfere with each other or would vignette the optical beam of the neighboring sources. We found that if we sacrificed a portion of the optical throughput of the source, we could collimate the rapidly diverging beam with a single-optical component in a reasonable distance and workable size at low cost. Optical throughput could be sacrificed and still have sufficient power to project a spot of enough intensity onto the SAL detector.

An alternative approach for development of a low cost array of SAL sources is a fiber-coupled laser and associated optical switch. In this case a single laser is coupled into a fiber that is switched optically with a plurality of fibers that compose the individual spatially separated sources. This approach could be used to generate sequential patterns of sources with a much larger signal to noise ratio. However, this improvement comes at the cost of requiring a more complex optical train for beam expansion and collimation, in addition to limitations on switching speed and the types of spatial and temporal patterns that can be generated. It should be clear to those knowledgeable in the art that certain applications of this invention could benefit from this approach, while others might benefit from the use of more simple low-cost sources, such as the LED and VCSEL.

A computer device 330 (e.g. a computer) controls the operation of and processes data from the SAL seeker and selects an activation profile 332 stored in memory 334 and sends the activation profile to control electronics 321 to activate the sources. To calibrate the STF for the SAL detector, the sources are activated in a phase delayed manner (mechanically or electronically switched) to measure the spatial displacement of the spot for each individual source. The known angular position (Az, El) of each fixed source is paired with the measured spatial displacement ($\Delta X$, $\Delta Y$) to create a table entry for the transfer function in a calibration table. Depending on the pattern of the fixed-source array, measured values may not exist for all table entries. These values may be calculated by interpolating from measured values. The table entries may also be interpolated to provide entries at regular intervals of spatial displacement.

Figure 4A:
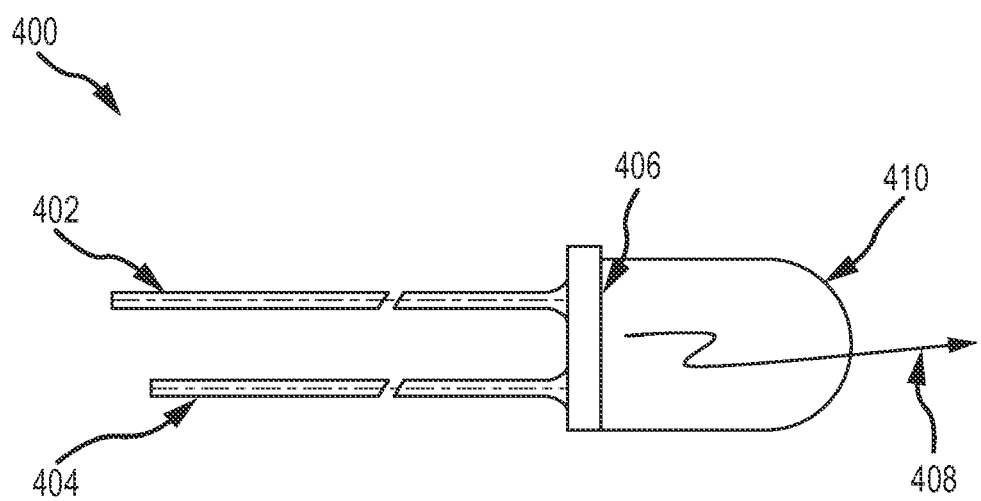
FIGS. 4a-4b are diagrams of an embodiment of a source comprising an LED.
Figure 4B:
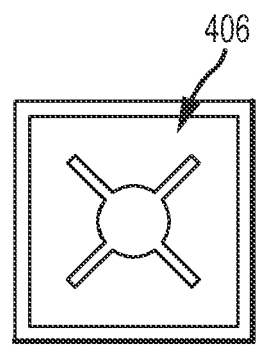

The throughput of the test system is largely determined by the dwell time of a given source needed to reliably detect a spot and the lag time to switch from activation of one source to activation of another source. The dwell time is a function of the number of pulses the sensor must detect to reliable detect a spot and the PRF of the source to deliver those pulses. Optical sensors such as the SAL detector can generally detect pulses over a certain pulse width range. Within that range the sensor may exhibit non-uniform noise properties. In lower noise regions of the pulse width range, the sensor detects incident pulses with a higher SNR and thus requires fewer received pulses to measure a spot position to the fidelity required for calibration. Both LEDs and VCSELs are capable of generating pulsed beams at very high PRFs, 10 kHz and higher. Furthermore, LEDs and VCSELS can be controlled via exterior electronics allowing for direct user control of the pulse width. The pulse width may be selected in a low noise region of the sensor. As a result, the dwell time at each source is at most approximately 100 ms, more typically approximately 1 ms and as low as approximately 0.1 ms. Because we are not slewing the sensor and do not have to wait for its response to settle, the lag time to switch is very short. The maximum time would be approximately 100 ms using a mechanical switch and a typical time would be approximately 100 micro seconds using electronic switching. In general, this time could be reduced even further until the point at which either the sensor under test is unable to resolve the separation of pulses, or the rise and fall time of the electronically activated sources limits pulse separation. The sensor under test can be designed to operate at a variety of different clock rates with a particular electronic bandpass, while typical LED and VCSEL rise and fall times are physically limited to approximately 10 ns, Referring now to FIGS. 4a-4b, an embodiment of an optical source comprises a Light Emitting Diode (LED) 400. The LED consists of an anode 402, a cathode 404 and a semiconductor p-n junction 406. When the diode is forward biased by application of a voltage, current flows from the anode 402 to the cathode 404, the charges carriers (electrons and holes) flow into the semiconductor p-n junction 406 (the active region) and combine. This lowers the energy level of the electron. The excess energy is released as a photon 408 through the transparent window 410.

The wavelength of the photon emitted by an LED depends on the band gap in the semiconductor. With proper selection of materials and/or doping concentration, the band gap can be engineered to produce photons anywhere from the near-UV to the near-IR, making it an excellent candidate for a calibration source for SAL systems. In addition, when the LED is properly activated, rise and fall times of approximately 10 ns are possible, allowing pulse widths from 20 ns to continuous wave. This functionality allows SAL calibration to be performed at a pulse width that minimizes the noise in amplitude estimation. A typical complaint of LED sources is that the divergence angle makes them difficult to collimate. However, if power levels are sufficient, a higher f/# optic can be used for collimation, making this a moot point. In addition, the large divergence provides a hidden advantage, by allowing a single optic to act as both a beam expander and collimator.

Figure 5A:
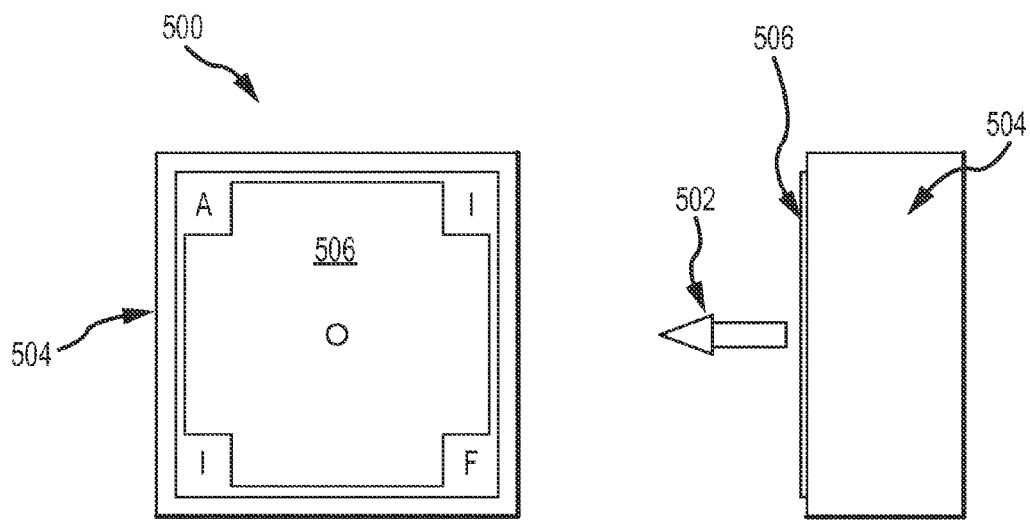
FIGS. 5a and 5b are diagrams of a VCSEL with bare die and chip on submount packaging options.
Figure 5B:
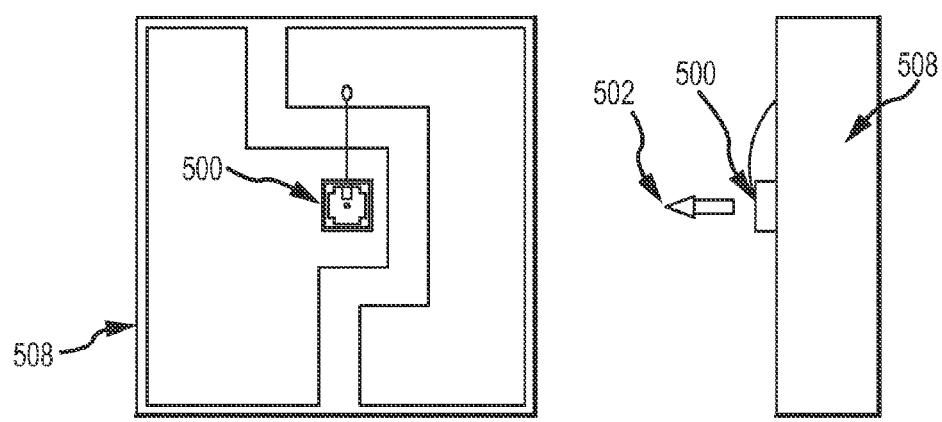

Referring now to FIGS. 5a-5b, an embodiment of an optical source comprises a Vertical Cavity Surface Emitting Laser (VCSEL) 500 in both a bare die and chip on submount packaging options. The VCSEL is a semiconductor laser diode with laser emission 502 orthogonal to the top surface. The component consists of quantum well region 504 (gain media) in addition to a p and n type semiconductor Bragg reflector region 506 that serves as the laser cavity. The component may be mounted as a chip on a submount 508. The wavelength of the photons emitted by a VCSEL is determined by the cavity geometry and gain media. With available manufacturing VCSEL wavelengths range from the visible to the short wave infrared, again making them particular useful for SAL calibration. While the divergence angle is smaller than a typical LED, it is still large enough to allow for a single optic to expand and collimate the source. However, due to the smaller divergence a VCSEL can provide a higher energy density. The VCSEL emission area is also smaller leading to a relaxation in the optic focal length requirement for a particular angular target size.

Figure 6:
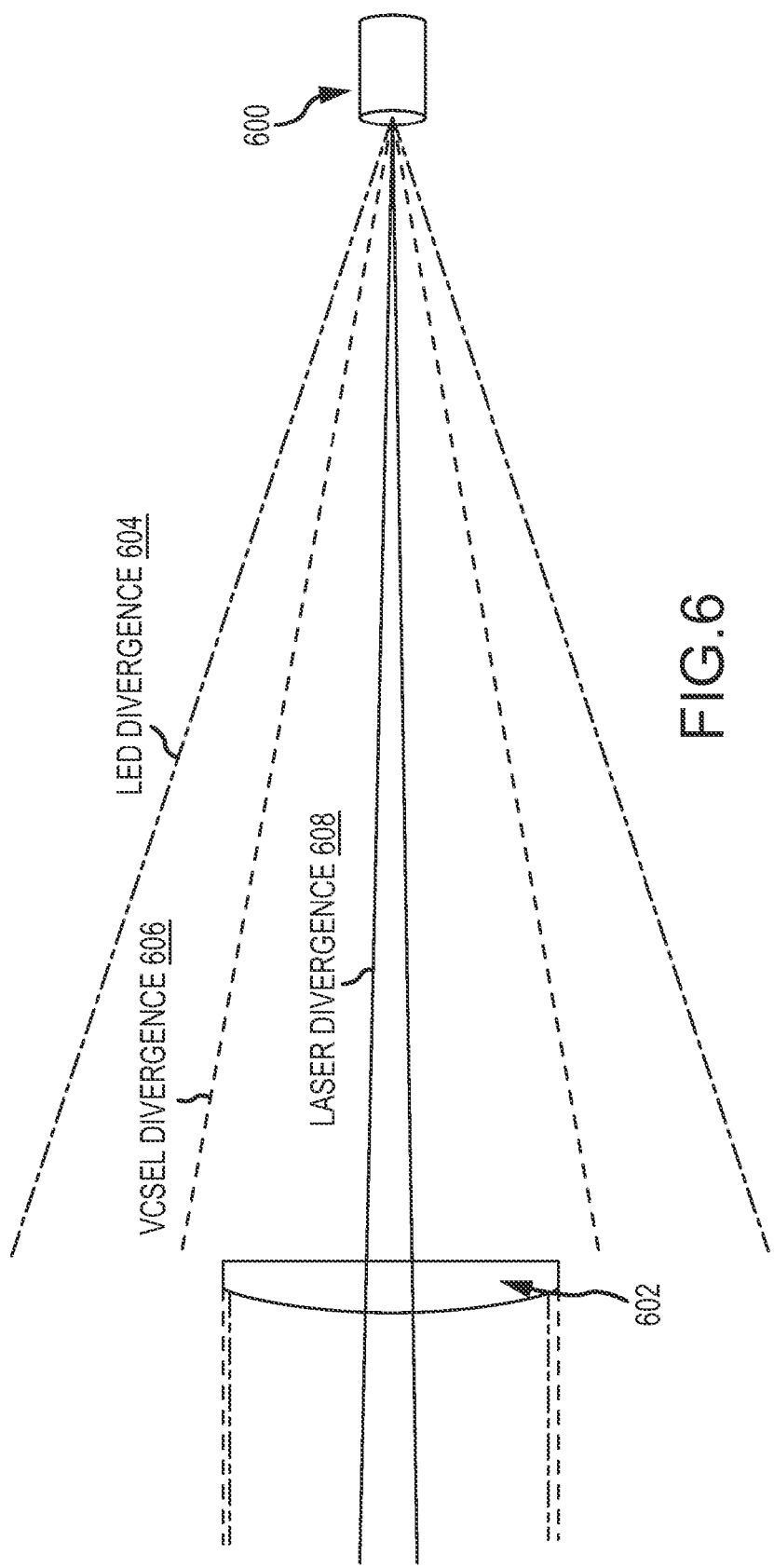
FIG. 6 is diagram of a single-optical component-collimating lens for either the LED or VCSEL source.

Referring now to FIG. 6, a source 600 such as an LED or VCSEL emits a diverging beam. A single optical component such as a plano-convex lens 602 intercepts a portion (less than 100%) of the beam and collimates that portion of the beam 603. The divergence of the LED beam 604 and VCSEL beam 606 expand to the size of the entrance pupil (actually somewhat larger to overfill the entrance pupil) and thus may be collimated by a single optic. VCSEL divergence is typically a better match for the acceptance angle of the lens 602, thus providing greater power density. If the f/# drops below approximately 2, the VCSEL will fail to fill the pupil, while the LED would continue to fill the pupil up to approximately an f/1 collimator. Because we sacrifice some amount of optical throughput we can greatly simplify the optical system for these higher divergence inexpensive sources. For purposes of comparison, the divergence of a laser beam 608 such as a Q-switched laser or laser diode is very small (actually much smaller than shown). A laser beam would require an additional optic to first expand the beam to the proper pupil size.

Figure 7B:
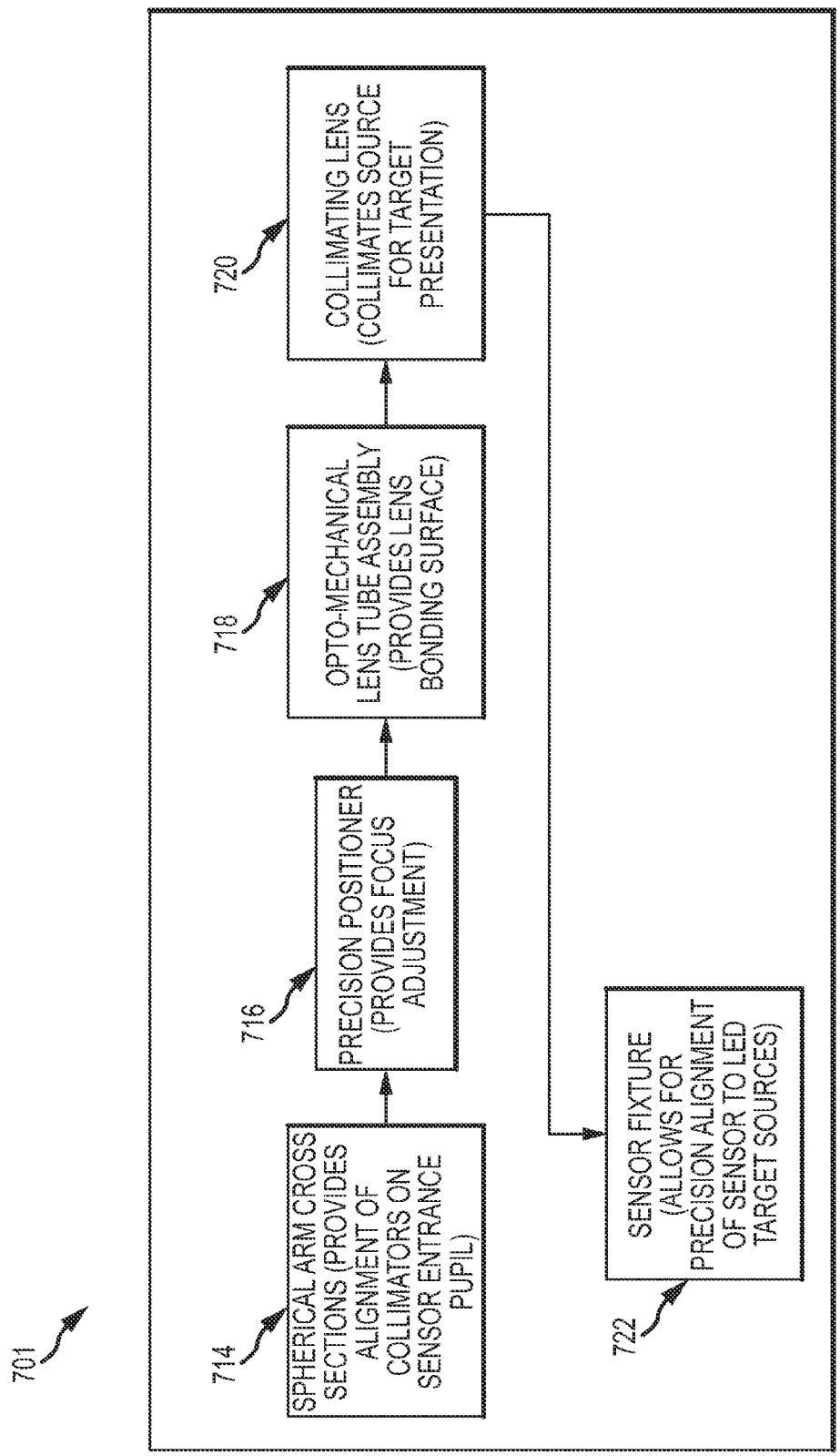

Referring now to FIGS. 7a and 7b, block diagrams for embodiments of the control electronics 700 for driving the fixed-source array and the opto-mechanical test bed 701 are illustrated. Control electronics 700 include a power supply 702 and a circuit card assembly (CCA) 704 that stores the phase delay (activation pattern) to activate the sources one at a time with minimum lag time to perform the STF calibration. An electronics switch tree 706 sends control signals to activate the different sources 708 in accordance with the specified phase delays to generate pulsed beams 710 in sequence. Each source 708 is also provided with a CCA 712 that controls the pulse width of the beam and provides adequate termination to minimize reflections back to the switch tree.

Opto-mechanical test bed 701 includes arms 714 that are sections of a spherical shell whose center of curvature coincides with the position of the sensor's entrance pupil. Alternately, this could be a section of a sphere with a full two-dimensional distribution of sources placed at fixed angular position at the desired fidelity. The sources are fixed to the arms so that they are perpendicular to the surface of the sphere and thus point at the entrance pupil at the center of the sphere. This greatly simplifies alignment of the sources. A precision positioner 716 provides focus and tip/tilt adjustment for the LED or VCSEL source. An opto-mechanical lens tube assembly 718 holds the source and provides a bonding surface for the collimating lens. A collimating lens 720 collimates each source to provide a stimulus or "target" at the fixed angular position for each source. A sensor fixture 722 aligns the sensor (SAL seeker) to the fixed-source array. The sensor fixture may be static or provide some range of motion to correct for any alignment errors.

Figure 8:
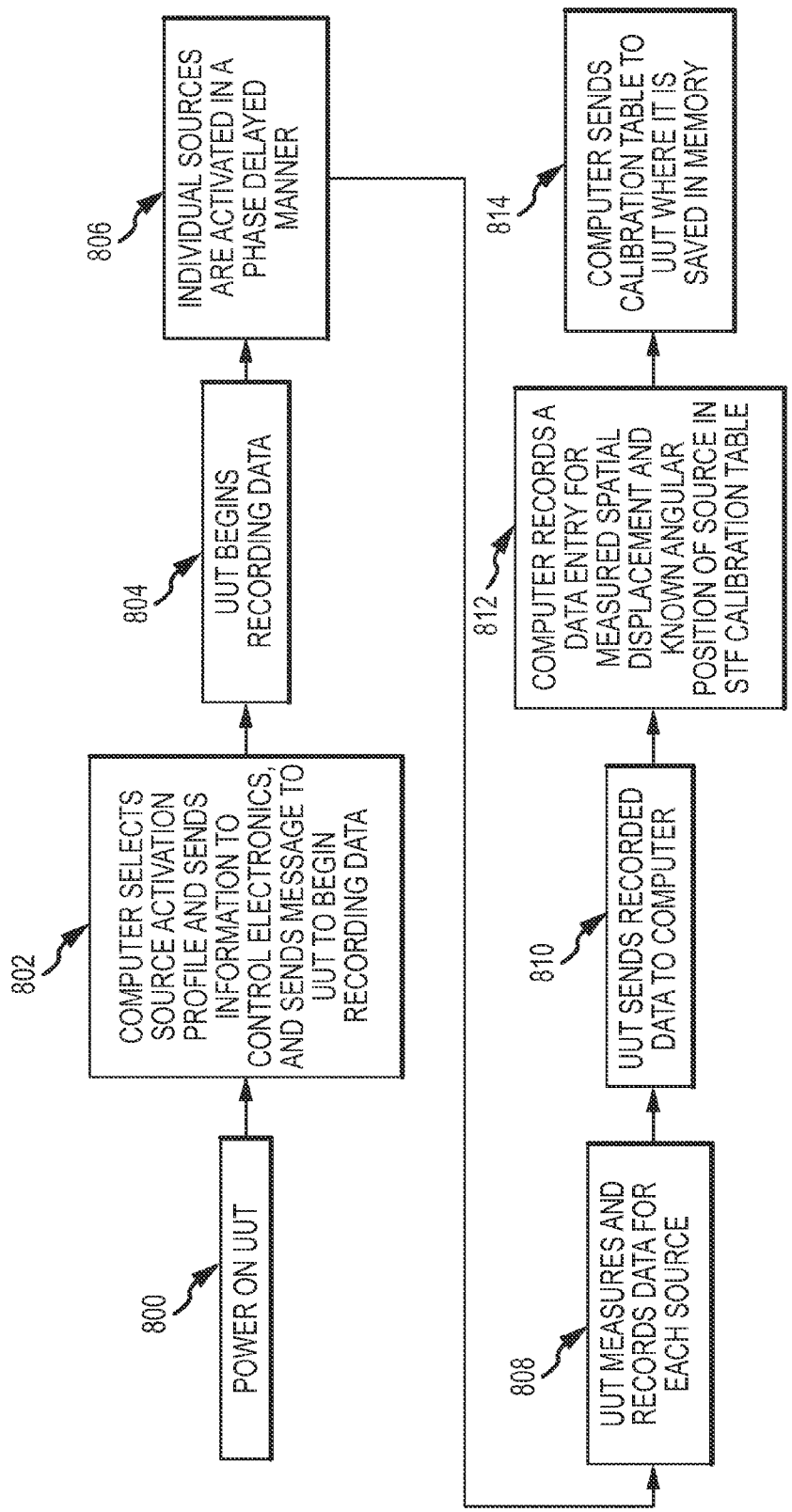
FIG. 8 is a flow diagram for the fixed-source array test station to calibrate a SAL seeker.
Figure 9:
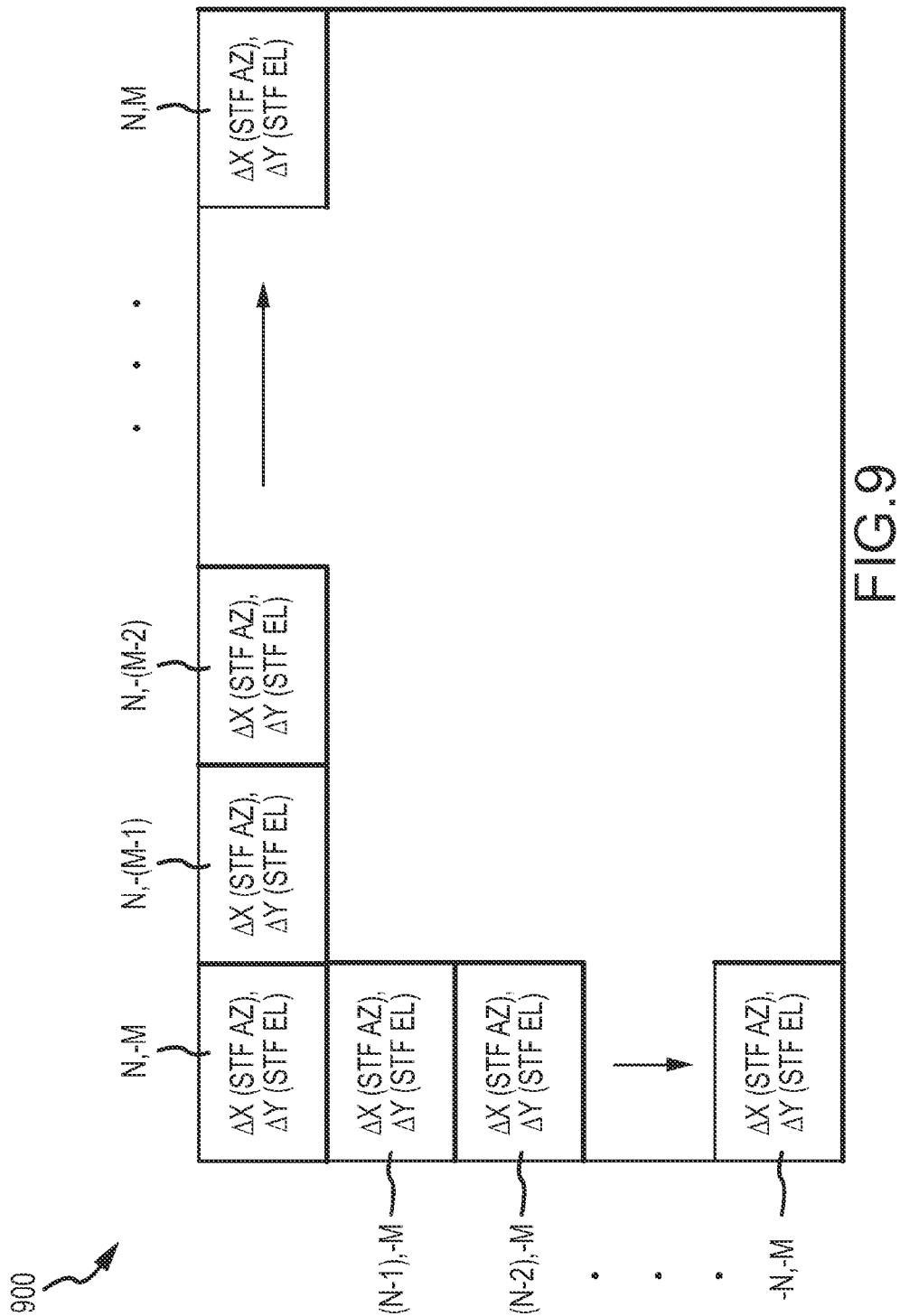
FIG. 9 is a calibration table for the SAL detector's STF.

Referring now to FIG. 8, an embodiment of the procedure for calibrating the SAL seeker's STF using the fixed-source array test station is illustrated. The unit under test, or UUT (SAL Seeker), is powered on to active the SAL detector and any other ancillary systems (step 800). The computer selects the source activation profile for SAL Seeker STF calibration and sends the profile to the control electronics that loads the appropriate phase delay into the CCA, and sends a message to the UUT to begin recording data (i.e. spatial displacements ΔX and ΔY) (step 802). The UUT begins recording data (step 804) and the individual sources are activated in a phase delayed manner one at a time to implement the activation profile (step 806). The UUT measures and records the spatial displacement for each source (step 808) and sends the recorded data to the computer (step 810). The computer records a data entry for the measured spatial displacement and known angular position of the source (step 812). This is done for each source to develop an STF calibration table 900 for the UUT as shown in FIG. 9. The computer may perform an interpolation of the data to fill in missing entries or to provide regularly indexed entries. The computer then sends the calibration table to the UUT where it is saved in memory (step 814).

Figure 10:
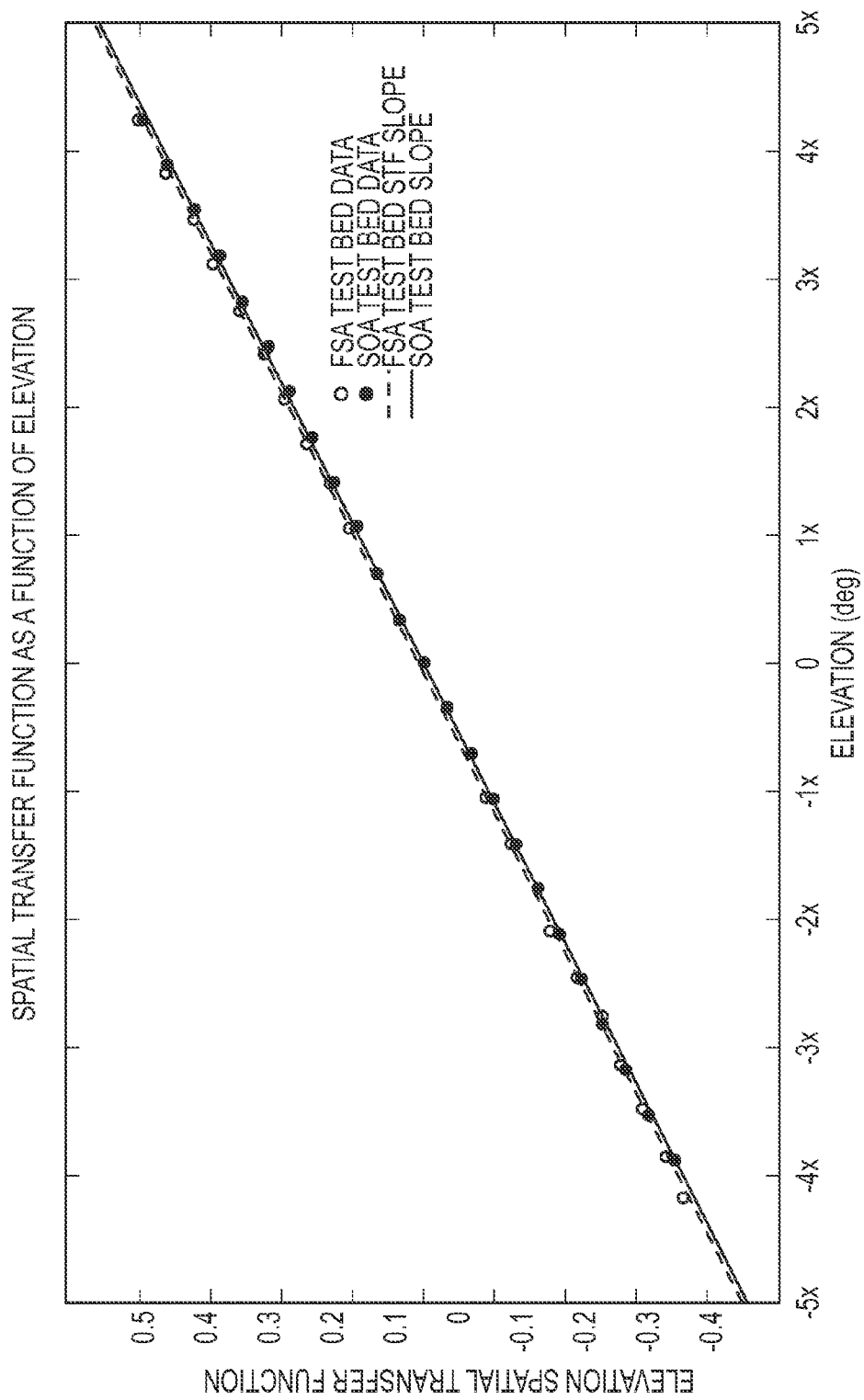
FIG. 10 is a plot of calibration data for the fixed-source array test station of the present invention and the conventional single-source test station.

Referring now to FIG. 10, plots of the Elevation STF vs. Elevation angle are shown for the current state-of-the-art SAL test bed ("SOA test bed") using a single Q-switched laser and a 3-axis stage to slew the SAL seeker and the fixed-source array of the present invention ("FSA test bed"). The performance of the $850,000 SOA test bed and the $50,000 fixed-source array test bed are virtually identical, with less than a 0.003 degree deviation across the calibrated FOV.

Figure 12:
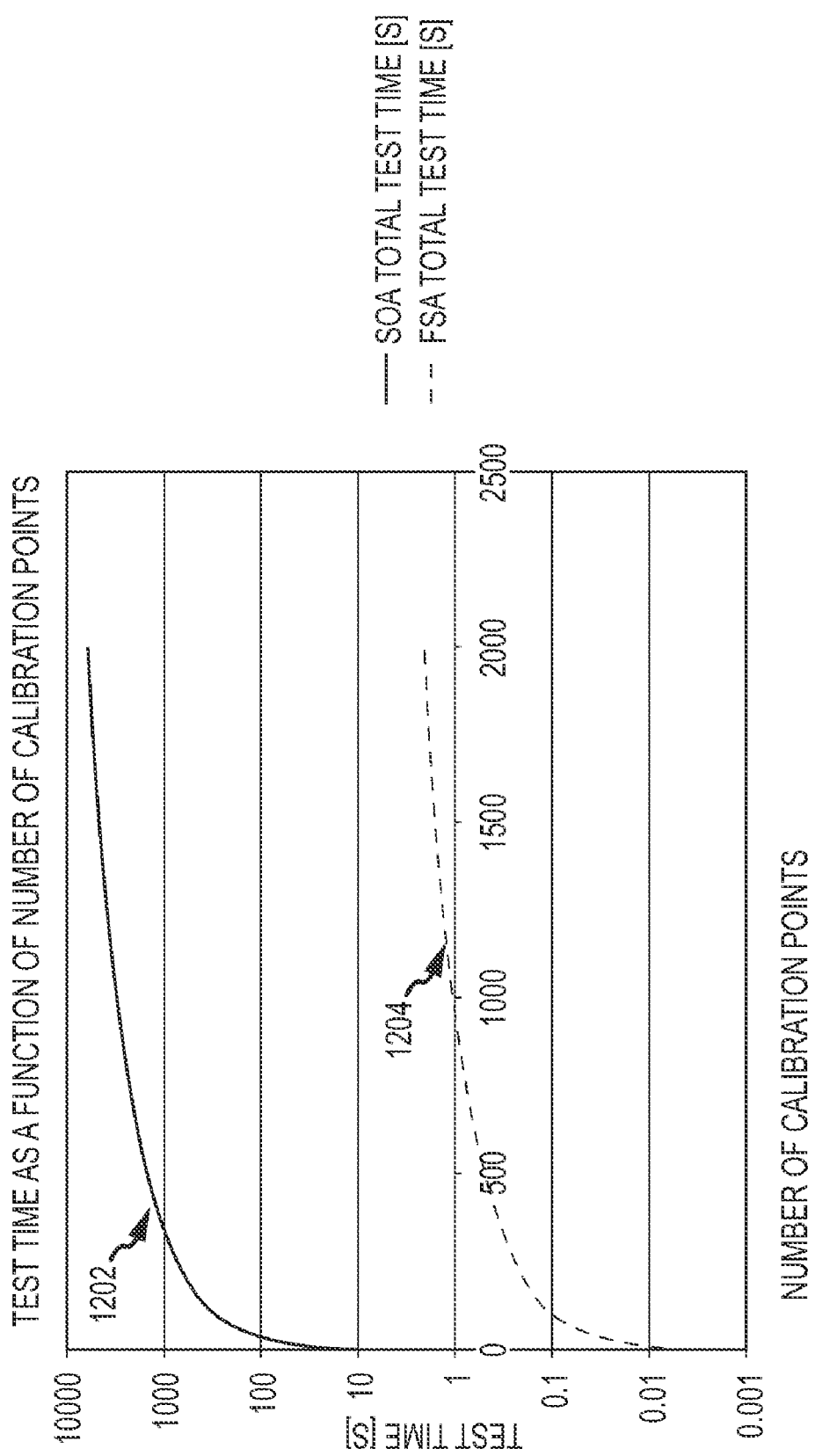
FIG. 12 is a plot comparing the test times as function of the number of calibration points for the fixed-source array and the state-of-the-art single-source test stations.

Referring now to FIGS. 11 and 12, a table 1100 and plots 1102 and 1104 are shown for the SOA test bed and an embodiment of the FSA test bed to compare throughput as function of angular fidelity or number of calibration points. As shown, the per source throughput of the FSA test bed is approximately three orders of magnitude (1000×) faster than the SOA test bed for low, medium and high fidelity calibrations. The throughput improvement is attributable to both a shorter dwell time per source to detect the spot and a shorter lag time to switch between sources. The dwell time is reduced because the LED or VCSEL can be pulsed at a much higher rate than the Q-switched laser and the pulse width can be tuned to a low noise region of the sensor thereby decreasing the number of required pulses per calibration point. The lag time is reduced because the SAL seeker does not have to slew to each angular measurement and allow the SAL detector to settle, which takes about 2.5 seconds. The fixed source array can be mechanically or electronically switched very quickly as there is no settling time issues for the detector. In a manufacturing environment in which large numbers of SAL seekers must be calibrated, a 1000× improvement in throughput is substantial.

In another embodiment, the test station stores in memory one or more activation profiles for different tests of the SAL seeker that require spatial or temporal stimulus patterns at fixed angular positions such as calibration, verification or characterization. For a given test, the computing device selects the appropriate activation profile, retrieves it from memory and provides it to the controller, which activates the sources according to the activation profile. The source intensity can be varied internally, over a limited range of operation, depending on the type of source in use. If larger intensity variations are required, a variety of external optical attenuation devices exist and are understood by those skilled in the art. The SAL detector senses the incident optical radiation according to the activation profile and passes the data to the computing device, which in turn processes the data. For example, a second activation pattern is stored in memory to simulate a targeting scenario that requires the sequential activation of at least a plurality of the sources with a phase delay of less than 100 micro seconds. The computer processes the data to either verify whether the SAL seeker performs as designed or to characterize how the SAL seeker performs. The detector may be mounted on a gimbal. The sources may be activated one at a time in a phase delayed manner in concert with the rotation of the gimbal to center each source on the SAL detector boresight. The computer processes the data to compute a calibration for the gimbal distortion. In another embodiment, the SAL seeker may be a dual-mode seeker comprising both a SAL detector and IR detector. In this case, the gimbal orientation may be calibrated using the IR detector. In addition, the sources can be activated in accordance with another activation pattern calibrate the IR to SAL alignment. IR sources may be activated in accordance with another activation pattern for the IR detector that turns multiple sources on simultaneously to calibrate IR distortion. For seekers that comprise an IR detector, an additional IR source is paired with the SAL source (e.g. LED or VCSEL or fiber optic) to generate a thermal signature detectable by the IR detector. For example, a miniature blackbody emitter may include a small resistor. A voltage is applied to the resistor causing current to flow and heat the resistor.

In another embodiment, the test station is used to test an optical sensor that requires stimulus at fixed angular positions over its FOV. These optical sensors may include imaging or non-imaging SAL detectors or imaging IR detectors for example. The optical sensor is mounted on a fixture. An array of fixed collimated optical sources (e.g. LED or VCSEL or blackbody) are distributed over the FOV of the sensor and co-aligned so that their respective optical beams overlap the entrance pupil of the sensor. A memory stores one or more source activation profiles to perform different tests. A controller responsive to a selected source activation profile activates the sources to implement the activation profile. A computer selects the source activation profile for a particular test, retrieves it from memory and provides it to the controller and is responsive to sensor data recorded for each source to process the data to perform the test. The tests may, for example, include calibration, verification or characterization.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A test station for calibrating a semi-active laser (SAL) seeker including a SAL detector, comprising:
   a fixture for mounting the SAL seeker, said seeker having an entrance pupil to detect optical energy over a field of view (FOV) and focus the optical energy into a spot on the SAL detector;
   an array of fixed collimated optical sources that generate respective temporally pulsed optical beams, said sources positioned over the FOV of the seeker and co-aligned so that their respective optical beams overlap the entrance pupil of the seeker;
   a memory that stores a first source activation profile to generate a transfer function for the SAL detector, said transfer function mapping a spatial displacement ΔX and ΔY in orthogonal axes of a centroid of the spot to azimuth and elevation angles for the source of the spot;
   a controller responsive to the first source activation profile to activate the sources one at a time in a phase delayed manner to implement the activation profile; and
   a computing device responsive to the measured spatial displacement ΔX and ΔY for each source as the source is activated to create a table entry for the transfer function in a calibration table that maps the measured ΔX and ΔY to the known azimuth and elevation angles of the activated source.

2. The test station of claim 1, wherein said optical source comprises a Light Emitted Diode (LED), a Vertical Cavity Surface Emitting Laser (VCSEL) or a fiber-coupled laser.

3. The test station of claim 2, wherein said LED or VCSEL comprises electronics to vary the pulse width so that the wavelength of the beam is in a lower noise region of the SAL detector.

4. The test station of claim 2, wherein said LED or VCSEL emit a diverging beam, said optical source comprising a single optical component that collimates a portion of the diverging beam of the size of the entrance pupil.

5. The test station of claim 4, wherein the single optical component comprises a single lens element.

6. The test station of claim 5, wherein said single lens element comprises a plano-convex lens.

7. The test station of claim 1, wherein said fixed collimated optical sources are positioned in a two-dimensional array over the FOV, said fixture on which the SAL seeker is mounted is fixed during calibration of the SAL seeker.

8. The test station of claim 1, wherein said fixed collimated optical sources are positioned in a one-dimensional array over the FOV, said fixture on which the SAL seeker is mounted rotates about an axis during calibration of the SAL seeker.

9. The test station of claim 1, wherein said fixed collimated optical sources are positioned on and substantially perpendicular to the surface of a sphere in which the entrance pupil of the SAL seeker is positioned at substantially the center of the sphere.

10. The test station of claim 1, wherein said controller activates the sources with a phase delay of less than 100 milliseconds.

11. The test station of claim 10, wherein the average test time per source is less than 100 milliseconds.

12. The test station of claim 1, wherein said memory stores a second activation pattern to simulate a targeting scenario, said targeting scenario requiring the sequential activation of at least a plurality of the sources with a phase delay of less than 100 micro seconds, said controller responsive to the second activation pattern to activate the sources to simulate the targeting scenario, said computing device responsive to the measured spatial displacement $\Delta X$ and $\Delta Y$ for each source to either verify whether the SAL seeker performs as designed or to characterize how the SAL seeker performs.

13. The test station of claim 1, wherein said detector is mounted on a gimbal in said SAL seeker, said memory stores a second activation pattern that activates the sources in a phase delayed manner, said controller responsive to said second activation pattern to activate the sources in the phase delayed manner in concert with the rotation of the gimbal to center each source on the SAL detector boresight.

14. The test station of claim 1, wherein each said source comprises a SAL source and a miniature blackbody emitter, wherein said SAL Seeker comprises an IR detector that is mounted on a gimbal in said SAL seeker, said memory stores a second activation pattern that activates the emitters in a phase delayed manner, said controller responsive to said second activation pattern to activate the emitters in the phase delayed manner in concert with the rotation of the gimbal to center each emitter on the IR detector boresight.

15. The test station of claim 1, wherein each said source comprises a SAL source and a miniature blackbody emitter, wherein said SAL seeker comprises an IR detector, said memory stores a second activation pattern for the IR detector and SAL detector to calibrate IR to SAL alignment, said controller activating the emitters to implement the activation profile, said computing device responsive to data from said IR and SAL detectors to calculate a calibration of the IR to SAL alignment.

16. The test station of claim 1, wherein the source comprises a SAL source and a miniature blackbody emitter, wherein said SAL seeker comprises an IR detector, said memory stores a second activation pattern for the IR detector that turns multiple emitters on simultaneously to calibrate IR distortion, said controller activating the emitters to implement the activation profile, said computing device responsive to data from said IR detectors to calculate distortion of the IR detector across the FOV.

17. A test station for calibrating a semi-active laser (SAL) seeker including a SAL detector, comprising:

a fixture for mounting the SAL seeker, said seeker having an entrance pupil to detect optical energy over a field of view (FOV) and focus the optical energy into a spot on the SAL detector;

an array of fixed collimated optical sources that generate respective temporally pulsed optical beams, said sources positioned over the FOV of the seeker on and substantially perpendicular to the surface of a sphere and co-aligned so that their respective optical beams overlap the entrance pupil of the seeker positioned at the center of the sphere, each said source comprising an LED or VCSEL that generates a pulsed diverging beam and a single optical-component that collimates the pulsed beam;

a memory that stores a first source activation profile to generate a transfer function for the SAL detector, said transfer function mapping a spatial displacement $\Delta X$ and $\Delta Y$ in orthogonal axes of a centroid of the spot to azimuth and elevation angles for the source of the spot;

a controller responsive to the first source activation profile to activate the sources one at a time in a phase delayed manner to implement the activation profile, said phase delay between activation of subsequent sources being less than 5 milliseconds; and a computing device responsive to the measured spatial displacement $\Delta X$ and $\Delta Y$ for each source as it is activated to create a table entry for the transfer function in a calibration table that maps the measured $\Delta X$ and $\Delta Y$ to the known azimuth and elevation angles of the activated source, the average time per table entry being less than 100 milliseconds.

* * * * *